Figure 1:
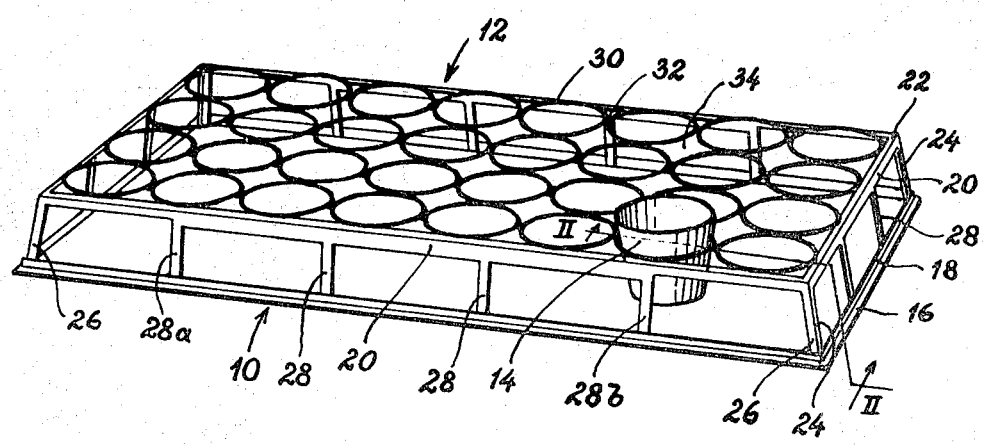

United States Patent

[11] 3,542,210

| [72] | Inventor | Jens Ole Sorensen |
| | | 56 Tornevangsvej, Birkerod, Denmark |
| [21] | Appl. No. | 759,627 |
| [22] | Filed | Sept. 13, 1968 |
| [45] | Patented | Nov. 24, 1970 |
| [32] | Priority | Sept. 18, 1967 |
| [33] | | Denmark |
| [31] | | No. 4656/67 |

[54] TRAY FOR PLANT POTS
8 Claims, 3 Drawing Figs.

| [52] | U.S. Cl. | 211/74, 211/13 |
| [51] | Int. Cl. | A47b 71/00 |
| [50] | Field of Search | 211/74, 71, 14, 13 |

[56] References Cited
UNITED STATES PATENTS

| 759,128 | 5/1904 | Plumer | 211/74 |
| 1,156,319 | 10/1915 | Schaub | 211/74 |
| 1,344,252 | 6/1920 | Baehr | 211/74 |
| 1,947,932 | 2/1934 | Fante | 211/71X |
| 2,360,224 | 10/1944 | Hannaford | 211/74X |
| 3,078,020 | 2/1963 | Boonstra | 211/74X |
| 3,184,071 | 5/1965 | Delaire | 211/74 |
| 3,388,807 | 6/1968 | Emmitt | 211/74 |

*Primary Examiner*—David H. Brown
*Attorney*—Young and Thompson

ABSTRACT: A tray for plant pots has horizontally obliquely angled channel members forming its top and foot, those at the top opening inwardly and downwardly and those at the foot opening outwardly and upwardly. The channel members are interconnected by inclined uprights, and the pots rest on members that in turn rest on the upper channel members.

Patented Nov. 24, 1970

3,542,210

INVENTOR
JENS OLE SØRENSEN
By Young + Thompson
ATTYS.

Patented Nov. 24, 1970 3,542,210

INVENTOR
JENS OLE SØRENSEN
BY Young & Thompson
ATTYS.

TRAY FOR PLANT POTS

During recent years plant pots for the forcing of plants have been increasingly used.

It is the object of the present invention to indicate a tray which will serve as a stand for a number of such pots while they are being filled with earth, sowed and left standing for the forcing of the plants, and which can also be used as a final transport packing for the pots.

Hitherto, the pots when they had to be transported were placed in plant cases wherein they were fixed by means of a cardboard insert having cut holes for the pots. For transport purposes it is also known to place the pots in stands formed as flat cardboard boxes where the holes for pots are cut out in the lid of the box. However, said inserts as well as the said stands are suitable as packing means only, and not as stands during the forcing of the plants, as they do not stand up against water. This means that after the forcing of the plants an extra packing operation has been necessary in order to make the pots ready for transport.

The use of plant plates of a waterproof material with a number of contiguous plant pots has also been proposed for the forcing of plants. Such plant plates, however, are so flexible that additional supporting means are required, e.g. in the form of cases or frames, when the filled plates are to be transported.

According to the present invention a tray is suggested to serve as a receptacle for plant pots, said tray which is made of a liquid-proof material, consisting of an inverted tray-shaped frame and a top surface composed of supporting bars for the pots, said bars forming a net of openings for receipt of the pots.

The fact that the tray consists of a liquid-proof material and the fact that the supporting surface of the tray is composed of supporting bars for the pots make the tray well suited for use in connection with the forcing of plants, not only because it stands up to moisture, but also because the supporting surface has an open structure ensuring a good ventilation, at the same time offering the advantage that during the filling of the pots excess earth can fall through the supporting surface and be used again. Furthermore, on account of the stated frame shape the tray is so stiff that without further aid it constitutes a support for the pots during their transport, so that additional transport means, such as cases, can be dispensed with.

All this means, that from the moment when the pots are to be filled with earth to the moment when they have been transported to their final destination the pots may remain in one and the same tray which has also served as transport packing for the pots. Thus, a substantially rationalization of the plant forcing and the distributing operations has been achieved.

In order to impart to the frame a high degree of rigidity the frame according to the invention is composed of a number of rod-shaped frame elements having a flat cross section.

According to the invention, in a particularly appropriate embodiment of the tray at least some of the supporting bars rest on top of elements of the frame at the edges of the top surface. Thus, it becomes possible to provide a standard frame forming the basis of trays for different sizes of plant pots, the openings in the supporting surface being made in different sizes to match the sizes of the pots concerned. The tray according to the invention is suitably produced by die-casting of a plastic material, and the said structure of the tray permits production of the tray in a mould with an interchangeable bottom, wherein the grooves for the said supporting bars are formed. By selectively using differently grooved die bottoms, one and the same standard frame can be provided with differently formed supporting surfaces for different sizes of pots.

According to the invention in another particularly appropriate embodiment of the tray the supporting bars form adjoining circles interconnected at their junctions, such a structure providing not only a good support for the pots but also a suitably open structure of the supporting surface.

Figure 2:
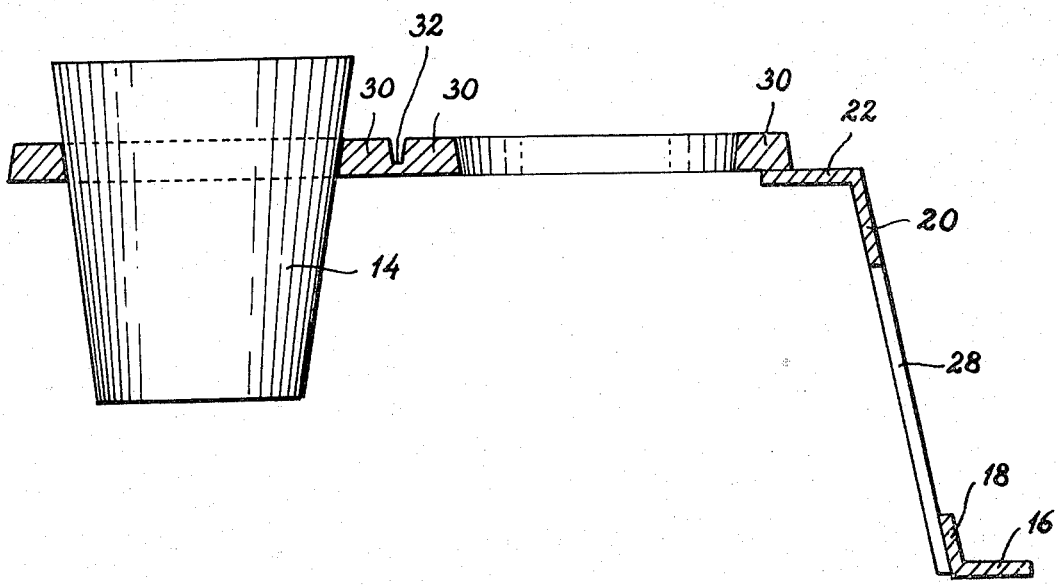
Figure 3:
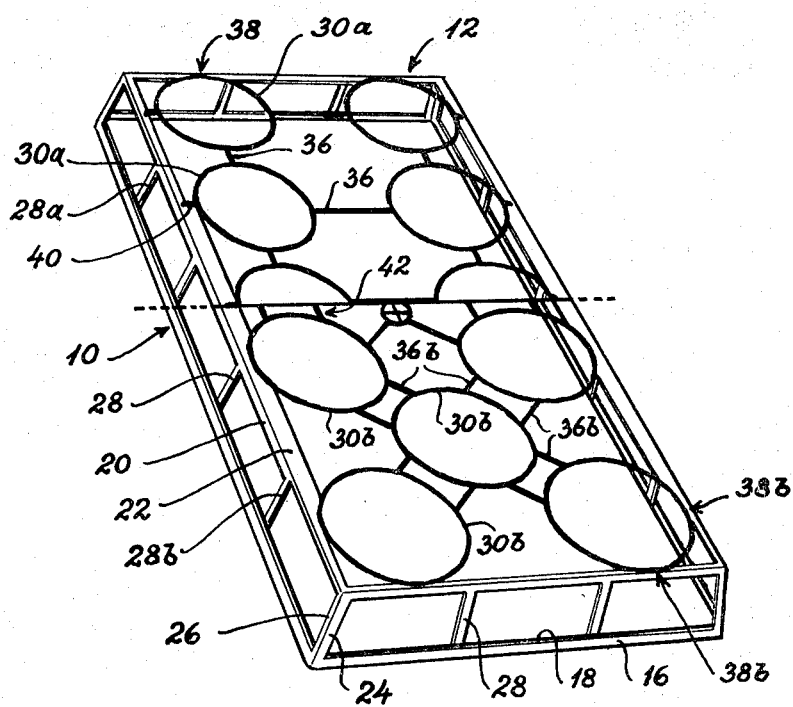

The invention will now be explained in more detail, reference being had to the drawing, wherein FIG. 1 is a perspective view of an embodiment of the tray according to the invention, FIG. 2 on an increased scale is a section taken along the line II-II in FIG. 1, and FIG. 3 shows two alternative embodiments of the tray according to the invention.

The tray consists of an inverted tray-shaped rectangular frame 10 and a supporting surface 12 for plant pots 14.

The frame is composed of a number of rod-shaped elements having a flat cross section. The lower part of the frame is composed of flat oblong elements 16 and 18 forming an outwardly open angle with one another, whilst the upper part of the frame is composed of flat oblong elements 20 and 22 forming an inwardly open angle with one another. The upper pairs of elements 20, 22 are spaced apart from the lower pairs of elements 16, 18 by means of pairs of flat oblong corner elements 24 and 26 forming inwardly open angles with one another, and by means of intermediate flat rod elements 28. At the longer sides of the frame the elements 20 are reinforced through increased height between the elements 28a, 28b, as shown on the drawing in FIGS. 1 and 3.

The supporting surface 12 is composed of a number of supporting bars 30 which in the embodiment according to FIG. 1 form adjoining circles interconnected at their junctions 32. Openings 34 are provided between the circles. The bars 30 are arranged in four rows with eight bars in each row. As appears from the drawing, the supporting bars 30 adjacent the elements 22 of the frame rest on top of these elements.

FIG. 3 shows two alternative embodiments of the supporting surface 12, whereas the frame structure 10 is the same as shown in FIGS. 1 and 2. In the upper half of FIG. 3 the surface 12 is composed of a number of circular supporting bars 30a not adjoining each other but interconnected by means of connecting bars 36. The bars 30a partly rest on the tops of the elements 22 of the frame as shown at 38, while at other points they are connected to the frame by means of bars 40. When use is made of bars 30a the surface is composed of two parallel rows of bars 30a, five circular bars 30a being provided in each row.

The lower half of FIG. 3 shows that the surface 12 is composed of a number of circular supporting bars 30b not adjoining each other but interconnected by means of connecting bars 36b. According to this embodiment the surface 12 is composed of three parallel rows of bars 30b, four circular bars 30b being provided in each of the lateral rows and two circular bars 30b in the intermediate row. In the lateral rows the bars 30b rest on top of the elements 22 of the frame as shown at 38b, whereas the bars 30b of the intermediate row are supported by means of the bars 38b interconnecting the said bars with the bars 30b of the lateral rows. As shown at 42 also some of the bars 30b of the lateral rows may be interconnected by bars 36b.

Thus, by varying the structure of the supporting surface 12 the tray can be adapted to different sizes of pots and if necessary also to different forms, e.g. polygonal forms of pots. Also other surface structures than those shown in FIGS. 1 and 3 may be used.

The tray consists of a liquid-proof material and is suitably produced by pressure die-casting of a plastic material. MOreover, it is so designed that the trays can be nested. The shown embodiment of the tray has the same external standard measurements as a plant case. The open structure of the sides of the frame ensures a firm grip on the tray. The sides may also be provided with special handles or special finger-grip openings not shown.

I claim:

1. A tray for plant pots, consisting of an inverted tray-shaped frame having a top surface, the frame being composed of oblong horizontally disposed rod elements constituting the foot of the frame and being composed of flat oblong elements arranged in pairs, the elements of a pair cohering along one of their longitudinal edges and together forming an outwardly open angle, and of oblong horizontally disposed rod elements constituting the top of the frame and being composed of flat oblong elements arranged in pairs, the elements of a pair cohering along one of their longitudinal edges and together forming an inwardly open angle, and of upstanding rod elements constituting spacing elements between the elements forming the foot and the top of the frame and being connected to the said last-mentioned elements, the top surface of the tray cohering with one element of each of the pairs of elements constituting the top of the frame, said one elements extending in a substantially horizontal plane, and the top of the surface being composed of coherent supporting bar elements, at least some portions of some of the last mentioned elements resting on the upper surface of the said one elements and cohering to these elements, and at least some of the supporting bar elements being arranged so as to define openings for receipt of the pots, all the said elements being made of liquid-proof material.

2. A tray for plant pots, consisting of an inverted tray-shaped frame having a top surface, the frame being composed of oblong horizontally disposed rod elements constituting the foot of the frame, and of oblong horizontally disposed rod elements constituting the top of the frame, the said rod elements constituting the foot and the top of the frame being composed of a pair of flat oblong elements, the elements of a pair cohering along one of their longitudinal edges and together forming an angle, and of upstanding rod elements constituting spacing elements between the elements forming the foot and the top of the frame and being connected to said last-mentioned elements, the top surface of the tray cohering with one element of each of the pairs of elements constituting the top of the frame, and the top surface being composed of coherent supporting bar elements at least some of which are arranged so as to define openings for receipt of the pots, all the said elements being made of liquid-proof material.

3. A tray for plant pots as claimed in claim 2, one element of each pair of elements on opposite sides of the frame together with the coherent upstanding rod elements extending in planes diverging in relation to each other away from the top surface of the frame.

4. A tray for plant pots, comprising an inverted tray-shaped frame having a top surface, the frame being composed of horizontally disposed elements constituting the foot of the frame and horizontally disposed elements constituting the top of the frame, the elements constituting the foot and top of the frame being composed each of a pair of flat elongated elements, the elements of each pair being interconnected along the longitudinal edges and together forming an angle, and upstanding elements constituting spacing elements between the elements forming the foot and the top of the frame and being connected to said last-mentioned elements, the top surface of the tray being interconnected with one element of each of the pairs of elements constituting the top of the frame, the top surface being composed of interconnected elements at least some of which are arranged so as to define openings for the receipt of the pots.

5. A tray for plant pots as claimed in claim 4, all the said elements being made of liquid-proof material.

6. A tray for plant pots as claimed in claim 4, the elements of the pairs constituting the top of the frame forming inwardly open angles and the elements of the pairs constituting the foot of the frame forming outwardly open angles.

7. A tray for plant pots as claimed in claim 4, at least some of said elements constituting said top surface resting on and being secured to said elements constituting said top of the frame.

8. A tray for plant pots as claimed in claim 4, one element of each pair of elements on opposite sides of the frame together with the upstanding elements connected thereto extending in planes diverging from each other away from the top surface of the frame.